Feb. 26, 1957  E. C. DUDEK  2,782,813
POWER DRIVEN HAND MANIPULATED PORTABLE SAWS
Filed Dec. 9, 1953  3 Sheets-Sheet 2
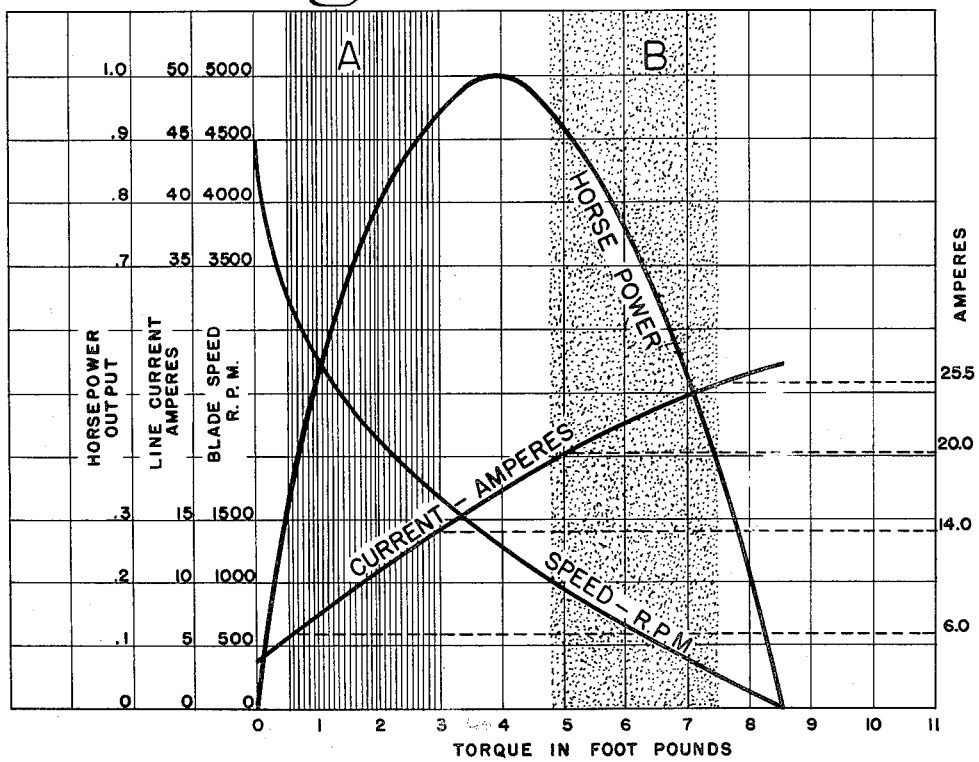
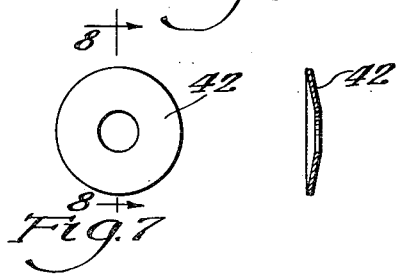
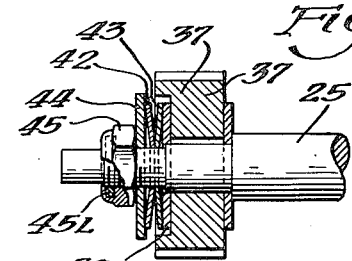
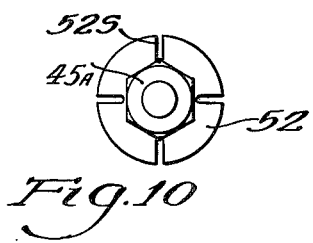
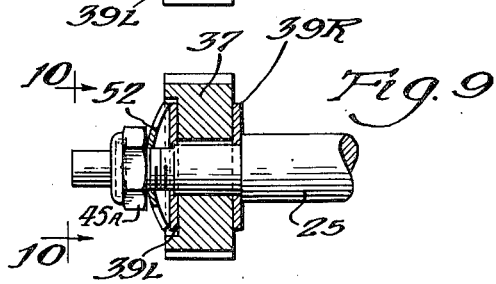
Inventor:
Edmund C. Dudek
By: Fred Ling
Attorney Feb. 26, 1957   E. C. DUDEK   2,782,813
POWER DRIVEN HAND MANIPULATED PORTABLE SAWS
Filed Dec. 9, 1953   3 Sheets-Sheet 3
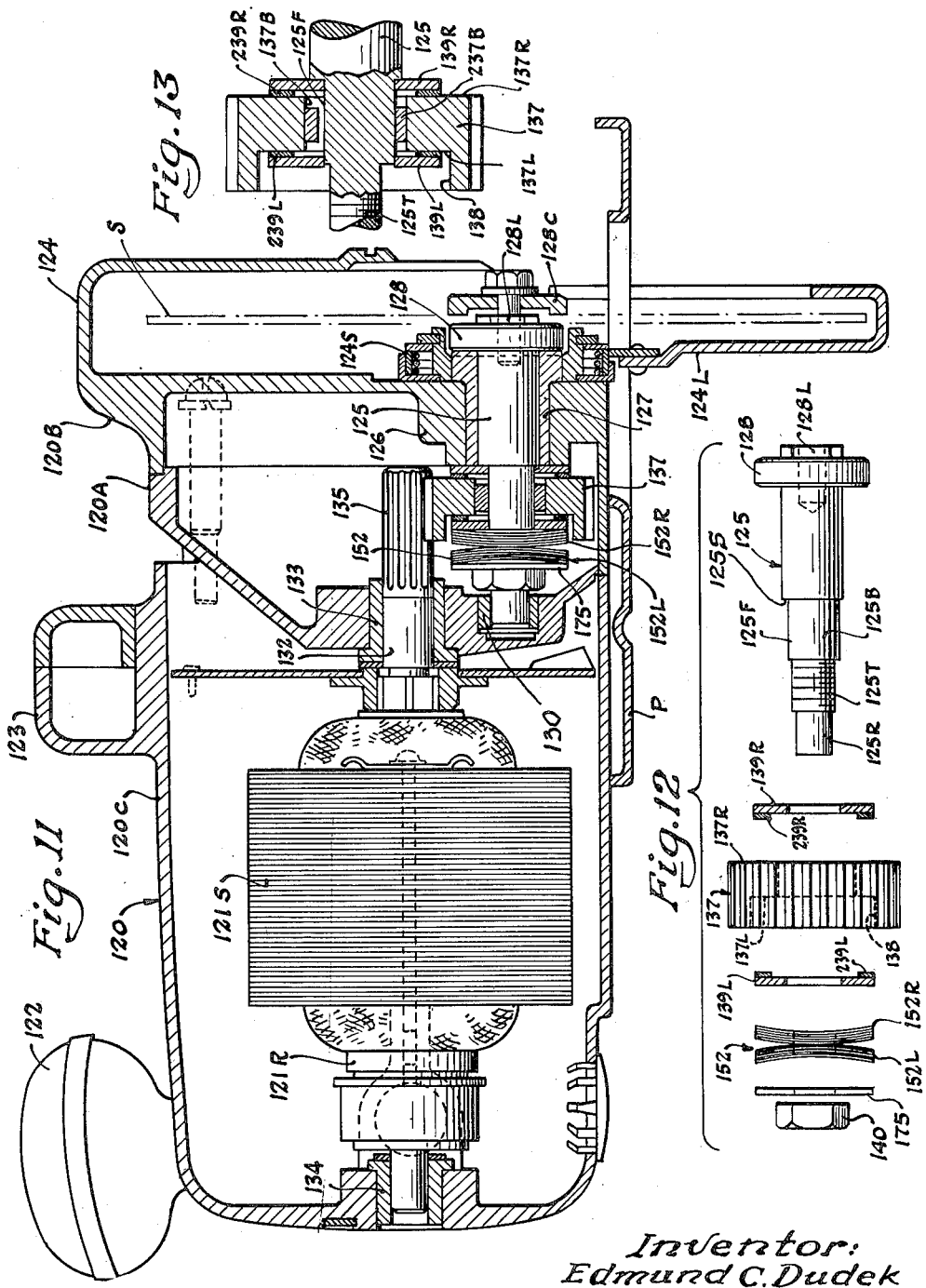
Inventor:
Edmund C. Dudek
By Fred Ging
Attorney

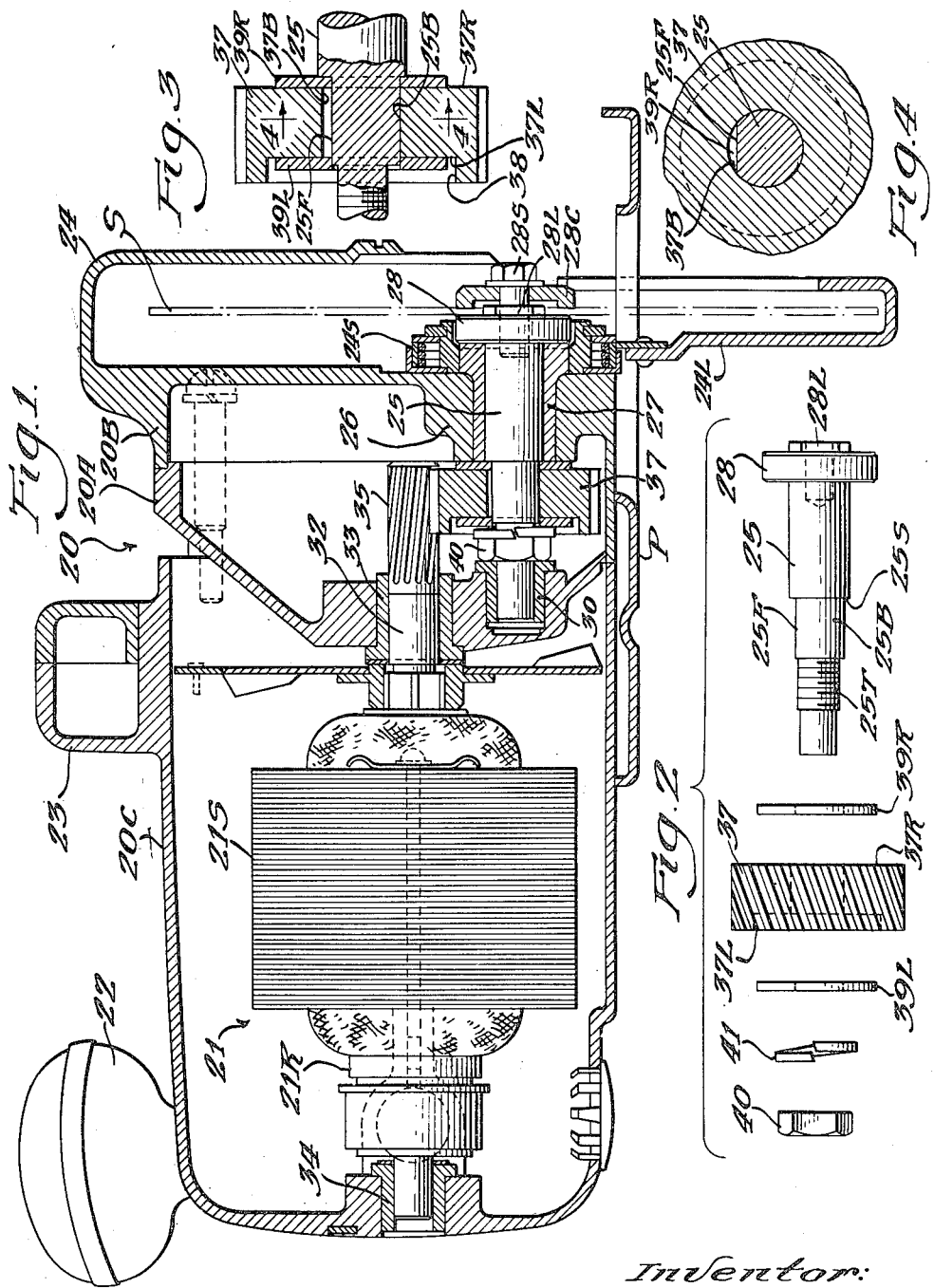

United States Patent Office 2,782,813
Patented Feb. 26, 1957

2,782,813

POWER DRIVEN HAND MANIPULATED PORTABLE SAWS

Edmund C. Dudek, Evergreen Park, Ill., assignor to Portable Electric Tools, Inc., Chicago, Ill., a corporation of Illinois Application December 9, 1953, Serial No. 397,196

2 Claims. (Cl. 143—43)

This application is a continuation-in-part of my co-pending application Serial No. 285,749, filed May 2, 1952, and forfeited.

This invention relates to power driven saws, and particularly to the driving connection between the power source and the saw blade.

In the use of power driven saws, it is well recognized that many situations occur where the saw blade does not operate properly, either due to an unusual retarding force applied to the blade, or due to extreme dullness of the blade. When a stoppage of the blade occurs, there are many dangerous or undesirable results that may follow, and this is particularly true in portable power driven hand saws of the kind commonly used in home work shops and in carpenter work performed in the field. Thus, when a saw blade is stopped due to an unusual retarding force applied thereto, there is often a twisting or breaking of the driving gears that are included between the power source and the saw blade, or other parts included in the driving train may break, and this, of course, is highly objectionable and troublesome.

Another such objectionable result is termed "kicking" in the trade, and this occurs when the kerf at the trailing edge of the saw blade is suddenly closed or clamped against the sides of the saw, and when this occurs, the direction of rotation of the saw is such as to cause the saw to be lifted or kicked out of the kerf and, in many instances, this kicking action is so violent that the operator loses control of the saw.

Another objectionable situation arises when the saw blade becomes dull and the operator, in an effort to cut or saw at a normal speed, imposes an unusually great force on the saw in an advancing direction. When this is done, the drive motor of such a saw draws an unusually high current, the efficiency of the motor drops, and the motor heats very rapidly. Continued use under such low efficiency conditions often causes the motor to burn out.

The desirability of correcting the objectionable characteristics hereinabove discussed has long been recognized, and many efforts have been made to accomplish this. Insofar as the overloading of the motor is concerned, this is, of course, the possibility of including an electrically operated overload switch mechanism, but this cannot be utilized in the great majority of portable electric tools, because such portable tools, in order to meet all of the market demands, must be made for operation on either alternating or direct current. A particular electrically operated overload mechanism will not operate on both alternating and direct current, and hence resort cannot be had in every instance to such an electrically operated mechanism.

Other efforts to avoid and correct the above mentioned difficulties have involved the use of a slip clutch, and such slip clutches have, in every instance of which I am aware, been included at the end of the mounting shaft upon which the saw blade is carried. Careful analysis of prior slip clutch arrangements utilized in the trade, shows that there is, in every instance, a tendency for such clutches to gradually become tighter, so as to finally constitute a direct and unyielding drive. Thus, the clutches utilized in the prior art have not been reliable in operation, and have eventually become inoperative to attain the results desired.

In view of the foregoing, it is the primary object of the present invention to overcome the undesirable results above set forth, and particularly it is an object of the present invention to afford a saw driving mechanism embodying a slip clutch which may be accurately regulated so as to prevent breaking of the parts of the saw and prevent operation of the motor in an inefficient manner. More specifically, it is an object of the present invention to afford a power driven saw wherein a slip clutch arrangement is afforded that does not vary in its torque transmitting capabilities in the course of continued use thereof.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a longitudinal section through a portable power saw having my special arbor and slip clutch arrangement;

Fig. 2 is an exploded view of all the elements making up the arbor assembly;

Fig. 3 is a longitudinal section of the gear mounting on the arbor;

Fig. 4 is a cross-section on the line 4—4 of Fig. 3;

Fig. 5 is a chart showing graphically the performance characteristics of a portable saw equipped with my arbor and slip-clutch arrangement;

Fig. 6 is a view similar to Fig. 3, but showing a modified form of slip clutch;

Fig. 7 is an elevation of a spring washer of the type used in the slip-clutch shown in Fig. 6;

Fig. 8 is a cross-section on line 8—8 of Fig. 7;

Fig. 9 is another view similar to Figs. 3 and 6, but illustrating still another modification;

Fig. 10 is an end elevation of the arbor, nut and spring washer shown in Fig. 9;

Fig. 11 is a sectional view similar to Fig. 1 and showing another alternative form of the invention;

Fig. 12 is an exploded view showing the elements of the arbor assembly of Fig. 11; and Fig. 13 is a longitudinal section of the gear mounting on the arbor.

For purposes of disclosure, the invention is herein illustrated as embodied in a portable saw unit 20, having a sectional housing that embodies sections 20A and 20B that are secured together to form a gear housing, and a motor housing section 20C that is secured to the housing section 20A, and within which an electric drive motor 21 is mounted. The motor housing section 20C has handles 22 and 23 formed thereon in a conventional relationship whereby the tool may be handled and manipulated, and the housing section 20B has a stationary guard section 24 formed integrally therewith, and within which a circular saw S may be supported by means including a rotatable saw arbor 25. A lower safety guard 24L is pivoted on the axis of the arbor 25 in a conventional manner beneath the guard 24, and is spring urged to its normal effective position by a spring 24S.

This lower guard 24L is disposed beneath a bottom plate P which may be stationary or pivoted in accordance with common practice and which governs the depth as well as the angle of cut.

The head 28 of the arbor is provided with a projecting non-circular lug 28L which is centered on the axis of the arbor and is complemental to the central opening in the saw blade S, and a fastening cap 28C put in place opposite the right hand face of the saw S is secured in place by a cap screw 28S which extends through the cap and is threaded axially into the arbor 25.

The saw arbor 25 extends through a bearing section 26 formed in the right hand wall of the housing section 20B, and is supported therein by a flanged bearing bushing 27, so that an enlarged mounting head 28 formed on the right hand end of the arbor 25 will be disposed below the lower open end of the guard 24, with the mounting head 28 abutting against the flanged end of the bearing bushing 27 in a thrust-bearing relationship. The saw arbor 25 extends through the gear housing that is afforded between the housing sections 20A and 20B, and has its reduced left hand end portion rotatably supported in a bearing bushing 30 that is, in turn, mounted in the left hand wall of the housing section 20A.

The motor 21 embodies a conventional stator 21S and a rotor 21R, this rotor having an output or driving shaft 32 that is supported in bearing bushings 33 and 34 that are afforded respectively in the left hand wall of the housing section 20A and the left hand end wall of the motor housing section 20C. The projecting right hand end of the motor shaft 32 is formed as a spiral gear 35, which is meshed with a spiral transmitting gear 36, and under and in accordance with the present invention the gear 36 is associated with the arbor 25 by friction clutch means, and the gear 36 forms part of such friction clutch means. Thus, the gear 37 has a right hand face 37R, as indicated in Fig. 3 of the drawings, and this face is formed in a single plane. The left hand end of the gear 37 is in the present case recessed as at 38, and the bottom of this recess constitutes a left hand friction face identified by the reference character 37L. The gear 37 has a cylindrical bearing opening 37B formed therein, as indicated in Fig. 4 of the drawings, and this cylindrical bearing surface 37B is arranged to embrace and rotate on a reduced bearing portion 25B formed on the arbor 25. In forming this reduced portion 25B, a shoulder 25S is formed that faces to the left, as viewed in Figs. 1, 2 and 3 of the drawings. Just to the left of the bearing section 25B, a screw threaded portion 25T is formed on the arbor 25, and the portion of the arbor to the left of the threaded portion 25T is further reduced, and affords the bearing portion that is supported in the bearing sleeve 30.

It will be noted that the bearing portion 25B is formed with a flat side 25F so that portions of the friction clutch may be interlocked in a rotative sense with the arbor 25, and such elements of the friction clutch means are afforded by metal discs 39R and 39L, which are identical in form, and which have generally D-shaped central openings which are complemental to the bearing portion 25B and the flat side 25F thereof. The washer or disc 39R is put in place on the bearing portion 25B in engagement with the shoulder 25S, and the gear 37 is put in place just to the left of the disc 39R, after which the disc 39L is put in place on the portion 25B of the arbor. Thus, the discs 39L and 39R are both rotatively interlocked with the arbor 25, while the gear 37 is capable of rotation with respect to the arbor 25 to the extent that such rotation is permitted by the frictional forces acting between the discs 39L and 39R and the opposed faces of the gear.

In accordance with the present invention, a predetermined spring loading is afforded on such elements of the clutch, and such loading is afforded in a way that renders the load-applying or adjusting means independent of any relative rotation that may take place between the gear 37 and the arbor 25. Thus a spring means is utilized for applying endwise forces between the washers 37L and 37R and the friction faces of the gear 37. Such spring means may take different forms, as will be described in detail hereinafter, and are located about the arbor 25, just to the left of the disc 39L, and such spring means are compressed by means of a nut 40 that is threaded on the section 25T of the arbor.

As shown in Figs. 1 to 3 of the drawings, such clutch-loading spring means are afforded by what amounts to an ordinary lock washer 41 which, of course, has a limited spiral form, as shown in Fig. 2 of the drawings, and which may be compressed by tightening of the nut 40 until the desired clutch-loading force is exerted on the clutch elements.

In Fig. 6 of the drawings, an alternative embodiment of the spring means is shown, and such spring means are afforded by a pair of slightly conical washer elements 42 and 43, which are disposed about the arbor 25, just to the left of the disc 39L in a reversed relationship with respect to each other. Thus, the outer edge of the disc or washer 43 bears against the disc 39L, while the outer edge of the disc or washer 42 bears against a relatively heavy washer 44 that is of normal form, and a nut 45 is threaded onto the section 25T of the arbor 25 for compressing the spring means that are afforded by the conical spring washers 42 and 43. As will be evident in Fig. 6 of the drawings, the nut 45 is, in this instance, illustrated as being of the stop-nut type, in that it includes a fiber locking element 45L of conventional form. Through the use of conical spring washers such as the washers 42 and 43, arranged in a series relationship as shown, it is found that a more precise regulation of the amount of spring pressure may be afforded where this is necessary and desirable.

In Fig. 9 of the drawings, another embodiment of the invention is illustrated wherein a more conventional type of spring washer 52 is illustrated, this washer 52 being generally dish-shaped or concave in form, and having radial slots 52S therein so that the washer 52 is, in effect, divided into four radial arms which bear against the disc 39L. A nut 45A, like the nut 45, is afforded on the threaded portion 25T of the arbor for adjusting the clutch loading pressure of the spring washer 52.

With all of the clutch arrangements that have thus been disclosed, it will be observed that the adjusting nut is isolated in a rotative sense from the gear 37, so that rotation of the gear 37 with respect to the arbor 25 cannot at any time act on the nut to impart tightening rotation thereto. This isolation of the screw threaded tightening means is effected by the washer 39L, which is itself rotatively fixed to the arbor 25.

Through the use of the present invention, a power saw unit may be safely operated for long periods of time without danger of the safety clutch becoming unduly tightened or inoperative, and this serves, of course, to materially increase the life of the tool. Thus, Fig. 5 of the drawings constitutes a diagram showing in a general way the relationship between the line current, the blade speed and the output horse power of the driving motor in such a power saw unit having a high speed universal motor. In this view, two shaded vertical areas are shown, the area A being the most desirable and efficient zone of operation, and portable saw units of the kind shown herein and of the kind which the present invention may be advantageously employed, are usually designed to operate within substantially the range indicated by the zone A in Fig. 5. It will be observed that in this zone, the output horse power is relatively high, the rotative speed of the saw is relatively high, and the current drawn by the motor is relatively low. When the rotative speed of the saw is reduced, as by dullness of the saw, an obstruction in the material, or inadvertent closing of the trailing portion of the saw kerf, the current drawn by the motor increases quite rapidly, as shown in Fig. 5, thus to objectionably increase the heating action in the motor, and, at the same time, the horse power output of the motor reduces very sharply, as is indicated in zone B of Fig. 5.

Thus through the use of the clutch arrangement that is disclosed herein, the spring means may be adjusted so that the clutch will slip when the power applied to the clutch exceeds the maximum power that is desired in the optimum zone of the power curve that is shown in Fig. 5. This serves to avoid all of the situations which might cause the tool to operate in zone B of Fig. 5, and hence breaking of the gears or other parts of the saw unit is avoided, and overheating of the motor is avoided. This, of course, serves to materially lengthen the useful life of the tool unit, and prevents objectionable and dangerous kicking of the saw in the event that the trailing portion of the saw-kerf is clamped upon the saw blade.

In Figs. 11 to 13 of the drawings another embodiment of the invention is illustrated as having a clutch of improved form, and in this embodiment, further simplifications of the tool 120, that are made possible by the use of the clutch, have been illustrated and will be described hereinafter. Thus in the form shown in Figs. 11 to 13, the portable saw unit 120 has a sectional housing that embodies sections 120A and 120B that are secured together to form a gear housing, and a motor housing section 120C that is secured to the housing section 120A, and within which an electric drive motor 121 is mounted. The motor housing section 120C has handles 122 and 123 formed thereon in a conventional relationship whereby the tool 120 may be handled and manipulated, and the housing section 120B has a stationary guard section 124 formed integrally therewith, and within which a circular saw S may be supported by means including a rotatable saw arbor 125. A lower safety guard 124L is pivoted on the axis of the arbor 125 in a conventional manner beneath the guard 124, and is spring urged to its normal effective position by a spring 124S. This lower guard 124L is disposed beneath a bottom plate or shoe P-1 which may be stationary or pivoted in accordance with common practice and which governs the depth as well as the angle of cut. The head 128 of the arbor 125 is provided with a projecting non-circular lug 128L which is centered on the axis of the arbor and is complemental to the central opening in the saw blade S, and a fastening cap 128C put in place opposite the right hand face of the saw S is secured in place by a cap screw 128S which extends through the cap and is threaded axially into the arbor 25.

The saw arbor 125 extends through a bearing section 126 formed in the right hand wall of the housing section 120B, and is supported therein by a flanged bearing bushing 127, so that an enlarged mounting head 128 formed on the right hand end of the arbor 125 will be disposed below the lower open end of the guard 124, with the mounting head 128 abutting against the flanged end of the bearing bushing 127 in a thrust-bearing relationship. The saw arbor 125 extends through the gear housing that is afforded between the housing sections 120A and 120B, and has its reduced left hand end portion 125R rotatably supported in a bearing bushing 130 that is, in turn, mounted in the left hand wall of the housing section 120A.

The motor 121 embodies a conventional stator 121S and a rotor 121R, this rotor having an output or driving shaft 132 that is supported in bearing bushings 133 and 134 that are afforded respectively in the left hand wall of the housing section 120A and the left hand end wall of the motor housing section 120C. The projecting right hand end of the motor shaft 132 is formed as a spur gear 135, which is meshed with a transmitting gear 137 which, as will be described, is of a simplified and relatively low cost form, and under and in accordance with the present invention the gear 137 is associated with the arbor 125 by friction clutch means, and the gear 137 forms part of such friction clutch means. Thus, the gear 137 has a right hand face 137R, as indicated in Figs. 12 and 13 of the drawings, and this face is formed in a single plane. The left hand end of the gear 137 is in the present case recessed as at 138, and the bottom of this recess constitutes a left hand friction face identified by the reference character 137L. The gear 137 has a cylindrical bearing opening 137B formed therein, and this cylindrical bearing surface 137B is arranged to embrace a cylindrical bearing sleeve 237B which rotates on a reduced bearing portion 125B formed on the arbor 125. In forming this reduced portion 125B, a shoulder 125S is formed that faces to the left, as viewed in Figs. 11, 12 and 13 of the drawings. Just to the left of the bearing section 125B, a screw threaded portion 125T is formed on the arbor 125, and the portion of the arbor to the left of the threaded portion 125T is further reduced, and affords the bearing portion 125R that is supported in the bearing sleeve 130.

It will be noted that the bearing portion 125B is formed with a flat side 125F so that portions of the friction clutch may be interlocked in a rotative sense with the arbor 125, and such elements of the friction clutch means are afforded by metal clutch discs 139R and 139L, which are identical in form, and which have generally D-shaped central openings which are complemental to the bearing portion 125B and the flat side 125F thereof.

The friction discs 139L and 139R as shown in Figs. 11, 12 and 13 have their friction clutch surfaces afforded by clutch facings 239L and 239R that are made from a friction material such as powdered metal, and these facings are in the form of rings secured by metal bonding to the discs 139L and 139R which act as backings for the friction material rings. The washer or disc 139R is put in place on the bearing portion 125B in engagement with the shoulder 125S, and the gear 137 is put in place just to the left of the disc 139R, after which the disc 139L is put in place on the portion 125B of the arbor. Thus, the discs 139L and 139R are both rotatively interlocked with the arbor 125, while the gear 137 is capable of rotation with respect to the arbor 125 to the extent that such rotation is permitted by the frictional forces acting between the discs 139L and 139R and the opposed faces of the gear 137.

The spring means utilized for applying endwise forces between the washers 137L and 137R and the friction faces of the gear 137 are located about the arbor 125, just to the left of the clutch disc 139L, and such spring means are compressed by means of a nut 140 that is threaded on the threaded section 125T of the arbor.

As shown in Figs. 11 to 13 of the drawings, such clutch-loading spring means are afforded by a plurality of conventional type of spring washers 152, each of which is similar to the spring washers 52 hereinbefore described, and these spring washers 152 being arranged in two sets 152L and 152R. Each of these sets as herein shown includes five spring washers 152, the spring washers in each set being nested with each other, and the two sets being disposed in reversed relation so that the convex faces of the two sets are engaged with each other. The nut 140 transmits its endwise force to the outer peripheral edge of the set 152L through a relatively heavy washer 175, and this nut is mounted on the threaded portion 25T of the arbor for adjusting the clutch loading pressure of the spring washer 52.

With the clutch arrangement that is shown in Figs. 11 to 13, it will be observed that the adjusting nut 140 is also isolated in a rotative sense from the gear 137, so that rotation of the gear 137 with respect to the arbor 125 cannot at any time act on the nut 140 to impart tightening rotation thereto. This isolation of the screw threaded tightening means is effected by the washer 139L, which is itself rotatively fixed to the arbor 125.

With the clutch structure hereinbefore described, it has been found that the operation of the saw has been rendered more reliable and safe, and that protection against overload and stalling is provided for the motor. Moreover, it will be evident that the protection thus afforded for the drive motor is effective without regard to the type of motor that is employed, and hence through the use of the present invention, it is possible to utilize different types of drive motors such as the electric motor herein shown, or motors of the internal combustion or air operated type.

The employment of the present invention under actual conditions of normal use has shown that the protection afforded by the clutch reduces the stresses on the working parts of the drive to such an extent that the gears 135 and 137 may be made as spur gears rather than as helical gears, and this of course reduces the cost of the saw structure. Furthermore, by reason of the use of spur gears, the power losses inherent in helical gears have been eliminated, thus to increase the efficiency of the tool.

In connection with the use of spur gears as is made possible by the present invention, it is important to note that one primary consideration that has heretofore led to the use of helical gears in tools of the character herein disclosed is the need to eliminate chatter in the gear train. Such chatter has invariably resulted in prior tools using spur gears, and heretofore it has been necessary to use accurately matched helical or like gears to eliminate this objectionable condition. Under the present invention, however, it is found that the presence of the clutch mechanism enables spur gearing to transmit the power without chatter, although no theory or logical reason can at this time be found which would explain this unexpected and desirable result.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a portable circular saw, including a gear housing and a motor housing in alignment therewith, a driving motor in said motor housing having a power shaft projecting into said gear housing through one wall thereof, a driven shaft parallel to said output shaft and having one end projecting through the other wall of the gear housing, said one end thereof having means for driving such a circular saw, a spur gear fixed with relation to said power output shaft within said gear housing, said driven shaft having a first bearing portion supported in an opposite wall of the gear housing, a gear mounting portion, a screw threaded portion and a second bearing portion the latter being supported in said one wall, said portions being arranged in that order between said one end and the other end of the driven shaft, means between said first bearing portion and said gear mounting portion providing a shoulder facing toward said other end of said driven shaft and in substantial alignment with the inner end of the said first bearing portion, a second spur gear meshed with said first spur gear and carried on said gear mounting portion and rotatable relative thereto, smooth surfaced friction discs on each side of and bearing axially against said second spur gear with one of said discs bearing against said shoulder, means affording a slidable non-rotatable connection between said discs and said gear mounting portion of said driven shaft, spring disc means loosely on the threaded portion of said driven shaft and abutting the other friction disc, and an adjustment nut on said threaded portion within said gear housing for adjusting the frictional engagement of said friction discs against the said second gear, and a circular saw mounted at the end of the driven shaft exteriorly of the gear housing, whereby when an abnormal resistance torque is applied to the revolving saw the driven shaft is stopped and the spur gear thereon rotates idly and without any undue torque being transmitted therefrom to the motor shaft, and thus preventing the saw from kicking abruptly away from the work or from the hand of the operator.

2. A portable circular saw as defined in and by claim 1 wherein a central portion of the axial face of the second spur gear is recessed, and one of the friction discs bears axially against the face of the second spur gear in the recess.

References Cited in the file of this patent

UNITED STATES PATENTS

| | | |
|---|---|---|
| 1,900,553 | Hampton | Mar. 7, 1933 |
| 2,014,229 | Emmons | Sept. 10, 1935 |
| 2,360,488 | Garman | Oct. 17, 1944 |
| 2,646,090 | Kluck | July 21, 1953 |